US012574751B2

(12) United States Patent (10) Patent No.: US 12,574,751 B2
Kim et al. (45) Date of Patent: Mar. 10, 2026

(54) METHOD FOR SETTING COMMUNICATION SCHEME, AND ELECTRONIC DEVICE USING SAME

(71) Applicant: SAMSUNG ELECTRONICS CO., LTD., Suwon-si (KR)

(72) Inventors: Minsoo Kim, Suwon-si (KR); Jeongyong Myoung, Suwon-si (KR); Sunggi Choi, Suwon-si (KR); Hyeonu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 18/199,764

(22) Filed: May 19, 2023

(65) Prior Publication Data

US 2023/0292138 A1 Sep. 14, 2023

Related U.S. Application Data

(63) Continuation of application No. PCT/KR2021/013447, filed on Sep. 30, 2021.

(30) Foreign Application Priority Data

Nov. 23, 2020 (KR) ........................ 10-2020-0158094

(51) Int. Cl.
*H04W 16/14* (2009.01)
(52) U.S. Cl.
CPC .................................. *H04W 16/14* (2013.01)
(58) Field of Classification Search
CPC .................................................... H04W 16/14

(Continued)

(56) References Cited

U.S. PATENT DOCUMENTS 7,929,912 B2 4/2011 Sherman
8,346,171 B1 1/2013 Mack
(Continued)

FOREIGN PATENT DOCUMENTS

CN 101646245 A 2/2010
JP 5548716 B2 7/2014
(Continued)

OTHER PUBLICATIONS

Li Xiang et al: "A Sniff Scheduling Policy for Power Saving in Bluetooth Piconet", Parallel and Distributed Systems, 2005. Proceedings. 11th International Conference on Fukuoka, Piscataway, NJ, USA, IEEE, vol. 1, Jul. 20, 2005 (Jul. 20, 2005), pp. 217-222, XP01 0852129, ISBN: 978-0-7695-2281-4.

(Continued)

*Primary Examiner* — Intekhaab A Siddiquee
(74) *Attorney, Agent, or Firm* — Sughrue Mion, PLLC

(57) ABSTRACT

An electronic device includes: a communication module configured to communicate with a first external device and a second external device; and a processor operatively connected to the communication module. The processor is configured to: identify a first frequency band used for communicating with the first external device; identify a second frequency band used for communicating with the second external device; and based on the first frequency band and the second frequency band at least partially overlapping, adjust a first sleep time of a Bluetooth (BT)/Bluetooth low energy (BLE) communication scheme associated with the first external device.

7 Claims, 13 Drawing Sheets

(58) Field of Classification Search

USPC .......................................................... 370/310

See application file for complete search history.

(56) References Cited

U.S. PATENT DOCUMENTS

| | | | |
|---|---|---|---|
| 8,693,950 B2 | 4/2014 | Desai | |
| 9,497,771 B2 | 11/2016 | Vangala et al. | |
| 10,172,146 B2 | 1/2019 | Liu et al. | |
| 2006/0101164 A1* | 5/2006 | Lee .......................... | G06F 9/462 |
| | | | 712/228 |
| 2006/0292986 A1* | 12/2006 | Bitran ................... | H04W 16/14 |
| | | | 455/562.1 |
| 2007/0135162 A1 | 6/2007 | Bauerjea et al. | |
| 2008/0139212 A1 | 6/2008 | Chen et al. | |
| 2009/0312010 A1 | 12/2009 | Hall | |
| 2010/0322287 A1 | 12/2010 | Truong et al. | |
| 2011/0312288 A1 | 12/2011 | Fu et al. | |
| 2015/0111610 A1 | 4/2015 | Hwang et al. | |

FOREIGN PATENT DOCUMENTS

| | | | |
|---|---|---|---|
| KR | 10-2009-0089373 A | 8/2009 | |
| KR | 10-2012-0024790 A | 3/2012 | |
| KR | 10-2016-0075627 A | 6/2016 | |

OTHER PUBLICATIONS

Communication dated Oct. 11, 2023 issued by the European Patent Office in European Application No. 21894875.0.

International Search Report (PCT/ISA/210) issued by the International Searching Authority on Jan. 14, 2022 in International Application No. PCT/KR2021/013447.

Written Opinion (PCT/ISA/237) issued by the International Searching Authority on Jan. 14, 2022 in International Application No. PCT/KR2021/013447.

\* cited by examiner

METHOD FOR SETTING COMMUNICATION SCHEME, AND ELECTRONIC DEVICE USING SAME

CROSS-REFERENCE TO RELATED APPLICATIONS

This application is a by-pass continuation application of International Application No. PCT/KR2021/013447, filed on Sep. 30, 2021, which is based on and claims priority to Korean Patent Application No. 10-2020-0158094, filed on Nov. 23, 2020, in the Korean Intellectual Property Office, the disclosures of which are incorporated by reference herein their entireties.

BACKGROUND

1. Field

The disclosure relates to a method for configuring a communication scheme and an electronic device using the same.

2. Description of Related Art

An electronic device provides various services and additional functions. The electronic device may be connected to other electronic devices via various communication schemes, which include 5G New Radio (NR), Long-Term Evolution (LTE), Bluetooth/Bluetooth Low Energy (BT/BLE), wireless fidelity (Wi-Fi), or ultra-wideband (UWB) communication. Some of these communication schemes may use the same frequency bands with other communication schemes. For example, a 2.4 GHz frequency band is an industrial, scientific, and medical band (ISM), which is available without a license, and thus, may be used by various communication schemes, such as BT/BLE, WLAN, or Zig-Bee.

A frequency band available without a license, such as the 2.4 GHz band, may be used by a plurality of communication schemes. However, a problem may occur when a plurality of communication schemes simultaneously uses the frequency band. For example, when a specific communication scheme monopolizes the frequency band, other communication schemes may not be able to use the frequency band. In another example, when a plurality of electronic devices shares the same frequency band without considering characteristics of a provided service or a connected device, the quality of a service provided by the electronic devices may be degraded.

SUMMARY

Provided is an electronic device that may use some frequency bands through a plurality of external devices and/or a plurality of communication schemes.

According to an aspect of the disclosure, an electronic device includes: a communication module configured to communicate with a first external device and a second external device; and a processor configured to be operatively connected to the communication module, wherein the processor is configured to: identify a first frequency band used for communicating with the first external device; identify a second frequency band used for communicating with the second external device; and based on the first frequency band and the second frequency band at least partially overlapping, adjust a first sleep time of a first communication scheme associated with the first external device.

The first communication scheme may be a Bluetooth (BT)/Bluetooth Low Energy (BLE) communication scheme.

The processor may be further configured to adjust at least one of Tsniff, Nsniff attempt, and Nsniff timeout, to control the first sleep time of the BT/BLE communication scheme.

The processor may be further configured to adjust at least one of Tsniff interval, Nsniff attempt, and Nsniff timeout, to control the first sleep time of the BT/BLE communication scheme, based on at least one of a type of the first external device and a type of the second external device.

The second external device may use the BT/BLE communication scheme with the electronic device.

The processor may be further configured to control a second sleep time of the BT/BLE communication scheme associated with the second external device.

The processor may be further configured to adjust the first sleep time of the BT/BLE communication scheme associated with the first external device and the second sleep time of the BT/BLE communication scheme associated with the second external device, based on a priority of the first external device and a priority of the second external device.

The second external device uses a second communication scheme with the electronic device, and the second communication scheme is different than the first communication scheme.

The first communication scheme may be a Bluetooth (BT)/Bluetooth Low Energy (BLE) communication scheme and the second communication scheme may be a wireless local area network (WLAN) communication scheme.

The processor may be further configured to: monitor first data transmitted to and received from the first external device; and adjust the first sleep time of the BT/BLE communication scheme associated with the first external device, based on a result of monitoring the first data.

The processor may be further configured to: monitor second data transmitted to and received from the second external device; and adjust the first sleep time of the BT/BLE communication scheme associated with the first external device, based on a result of monitoring the second data.

The processor may be further configured to: determine whether the second data requires low latency or high-capacity data; and adjust the first sleep time of the BT/BLE communication scheme associated with the first external device, based on a result of determining whether the second data requires low latency or high-capacity data.

According to an aspect of the disclosure, an operating method of an electronic device includes: identifying a first frequency band used for communicating with a first external device; identifying a second frequency band used for communicating with a second external device; and based on the first frequency band and the second frequency band at least partially overlapping, adjusting a first sleep time of a first communication scheme associated with the first external device.

The first communication scheme may be a Bluetooth (BT)/Bluetooth Low Energy (BLE) communication scheme.

The adjusting the first sleep time of the BT/BLE communication scheme associated with the first external device may include adjusting at least one of Tsniff, Nsniff attempt, and Nsniff timeout to adjust the first sleep time of the BT/BLE communication scheme.

The adjusting the first sleep time of the BT/BLE communication scheme associated with the first external device may include adjusting at least one of Tsniff interval, Nsniff attempt, and Nsniff timeout to adjust the first sleep time of the BT/BLE communication scheme based on a type of the first external device and a type of the second external device.

The second external device may use the BT/BLE communication scheme with the electronic device.

The operating method may further include adjusting a second sleep time of the BT/BLE communication scheme associated with the second external device.

The operating method may further include adjusting the first sleep time of the BT/BLE communication scheme associated with the first external device and the second sleep time of the BT/BLE communication scheme associated with the second external device, based on a priority of the first external device and a priority of the second external device.

The second external device may use a wireless local area network (WLAN) communication scheme with the electronic device.

According to one or more embodiments of the disclosure, an electronic device may connect to a plurality of devices. When sharing an antenna by sharing at least part of a frequency band to communicate with the plurality of devices, the electronic device may adjust an antenna use time to improve performance and reduce current consumption.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram of an electronic device in a network environment according to one or more embodiments;

FIG. 7A and FIG. 7B illustrate an example of adjusting sleep times of a plurality of electronic devices (e.g., an electronic device, a headset, and a S-pen) connected using a BT/BLE communication scheme according to one or more embodiments;

FIG. 8A and FIG. 8B illustrate another example of adjusting sleep times of a plurality of electronic devices (e.g., an electronic device, a headset, and a S-pen) connected using a BT/BLE communication scheme according to one or more embodiments.

DETAILED DESCRIPTION

Figure 1:
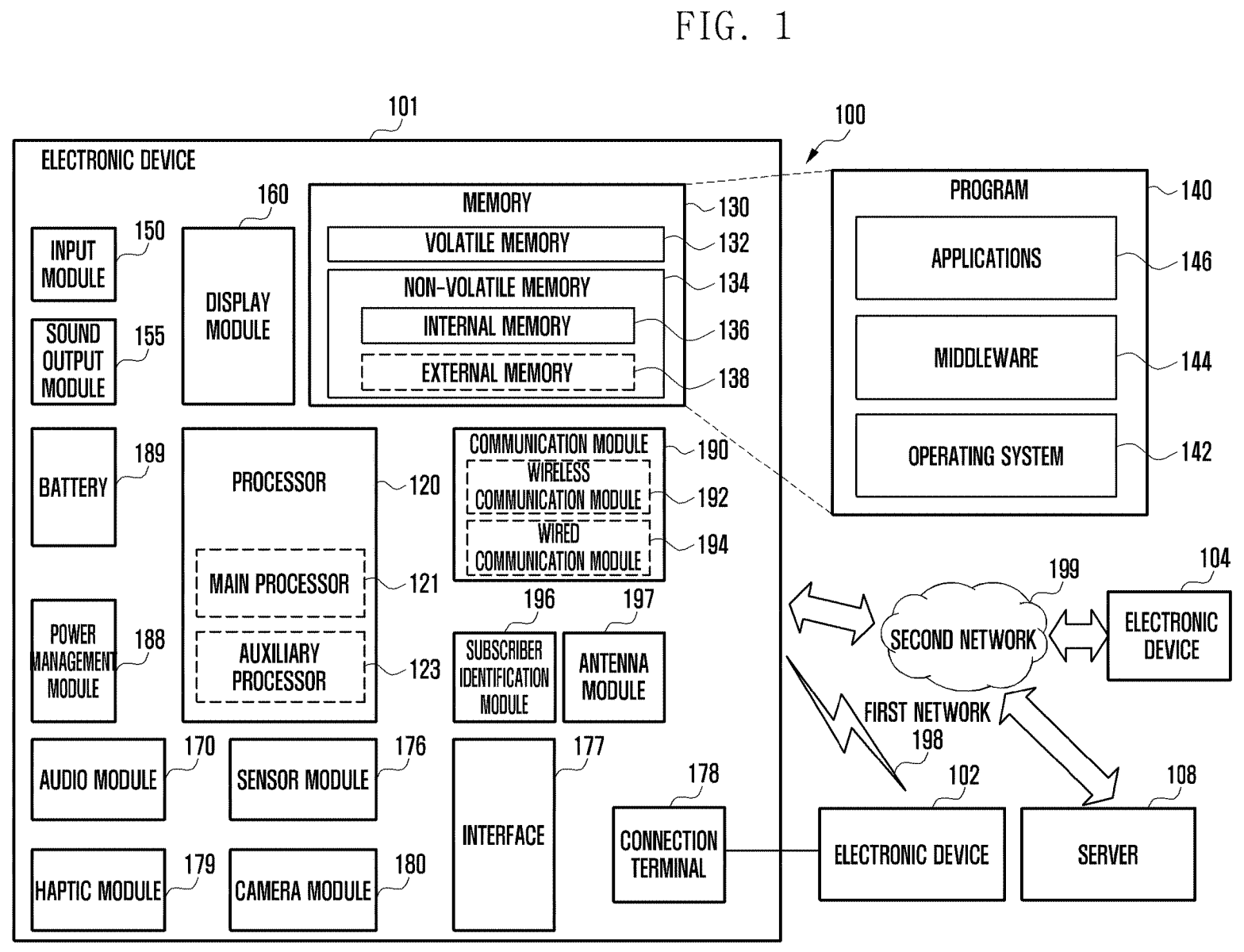
Figure 2:
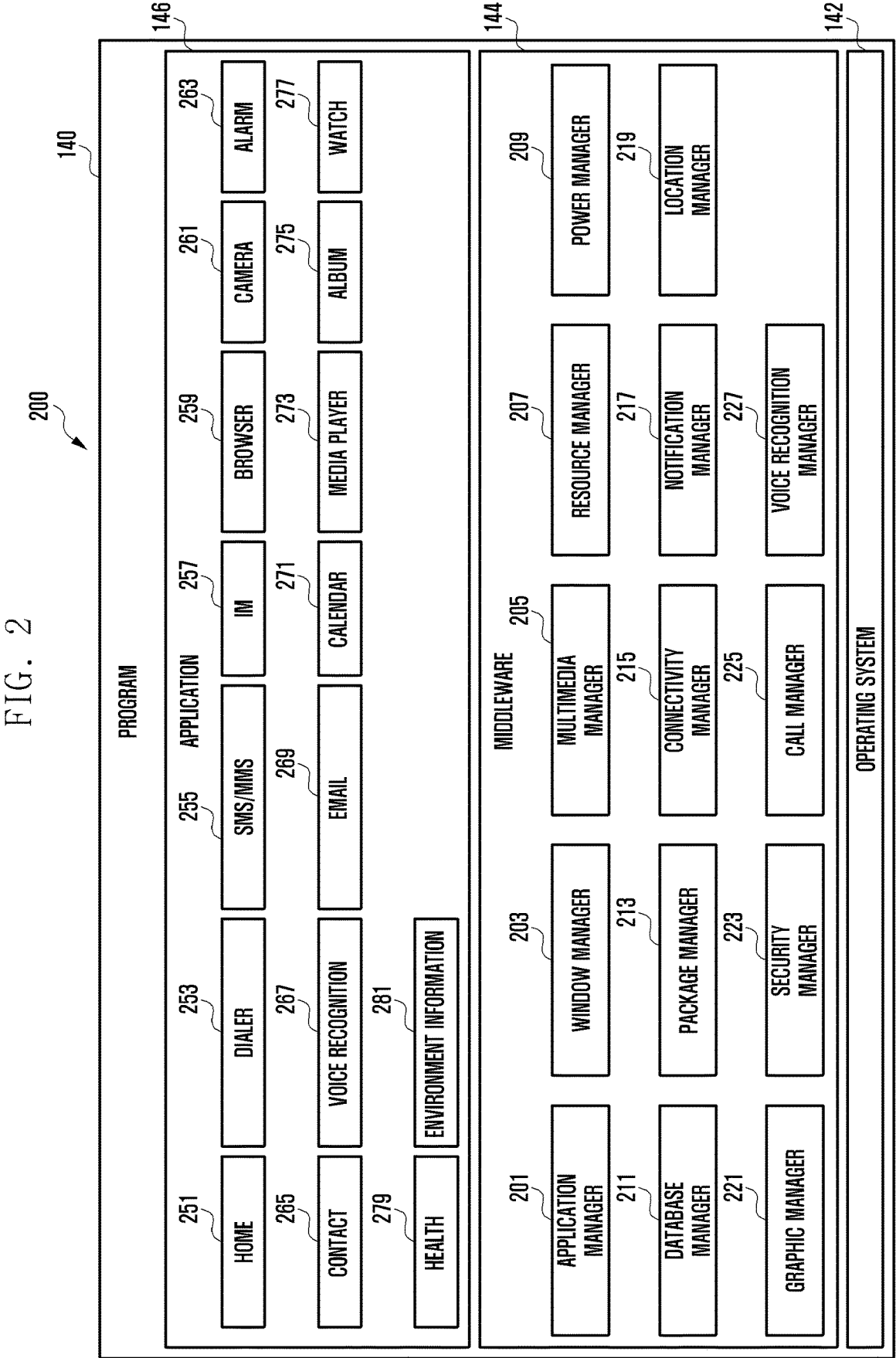
FIG. 2 is a block diagram illustrating a program according to one or more embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

Figure 3:
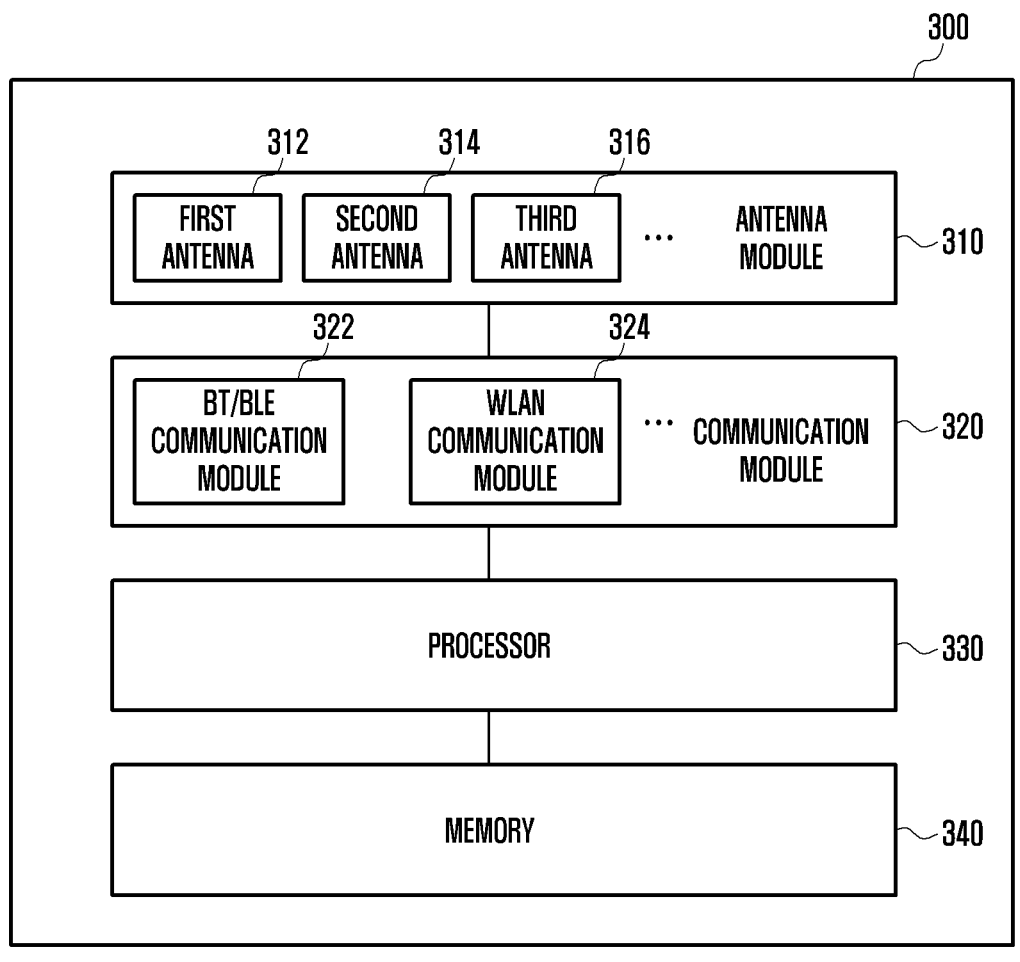
FIG. 3 is a block diagram of an electronic device according to one or more embodiments.

FIG. 3 is a block diagram of an electronic device 300 according to one or more embodiments. The electronic device 300 (e.g., the electronic device 101 of FIG. 1) may communicate with a network via short-range wireless communication (e.g., Bluetooth/Bluetooth Low Energy (BT/BLE), a wireless local area network (WLAN), or ultra-wideband (UWB)). The electronic device 300 may communicate with the network via long-range wireless communication (e.g., cellular communication such as 3G/4G/5G).

The electronic device 300 may include an antenna module 310 (e.g., the antenna module 197 of FIG. 1), a communication module 320 (e.g., the communication module 190 of FIG. 1), a processor 330 (e.g., the processor 120 of FIG. 1), and a memory 340 (e.g., the memory 130 of FIG. 1). According to one or more embodiments, the electronic device 300 may include at least some of components and/or functions of the electronic device 101 of FIG. 1.

The antenna module 310 may transmit and/or receive a signal so that the electronic device 300 may wirelessly communicate with the network or an external device (e.g., the electronic device 102, the electronic device 104, or the server 108 of FIG. 1). According to one or more embodiments, the antenna module 310 may include a plurality of antennas 312, 314, and 316. The plurality of antennas 312, 314, and 316 may respectively have different frequency bands for transmitting and/or receiving a signal. The antennas having the different frequency bands for transmitting and/or receiving the signal may support different communication schemes. However, when communication schemes are different but used frequency bands are the same or similar, the electronic device 300 may use the same antenna.

For example, among the plurality of antennas 312, 314, and 316, a first antenna 312 may transmit and/or receive a signal in a 2.4 GHz frequency band, and a second antenna 314 may transmit and/or a signal in a 5 GHz frequency band. A BT/BLE communication scheme may use the first antenna 312 to use a signal in the 2.4 GHz frequency band (2400 to 2483.5 MHz), and a WLAN communication scheme may use both the first antenna 312 and the second antenna 314 to use a signal in the 2.4 GHz/5 GHz frequency band (2400 to 2483.5 MHz/5.15 to 5.825 GHz).

The first antenna 312 may support the 2.4 GHz frequency band (2400 to 2483.5 MHz), and thus, may be used in both the BT/BLE communication scheme and the WLAN communication scheme. Although the frequency bands are identical to 2400 to 2483.5 MHz herein, the frequency bands do not necessarily match, and the disclosure may be applied to any case where frequency bands are similar, and thus, the same antenna needs to be used. In one embodiment, a first frequency band for the BT/BLE communication scheme and a second frequency band for the WLAN communication scheme may partially overlap.

According to one or more embodiments, the plurality of antennas 312, 314, and 316 may be selected by the communication module 320 or the processor 330. The communication module 320 may include a software and/or hardware module (e.g., a communication processor) for wirelessly communicating with the network or the external device (e.g., the electronic device 102, the electronic device 104, or the server 108 of FIG. 1), and may include at least some of components and/or functions of the wireless communication module 192 of FIG. 1.

According to one or more embodiments, the communication module 320 may include a BT/BLE communication module 322 or a WLAN communication module 324 to communicate with the external device via a local area network. According to one or more embodiments, the communication module 320 may communicate with the external device through a long-range communication network. According to one or more embodiments, the communication module 320 may transmit data provided from the processor 330 to the external device, or may receive data from the external device to transmit the data to the processor 330.

The processor 330 may process data in the electronic device 300, may control at least one other component of the electronic device 300, and may perform data processing and an operation. The processor 330 may be electrically and/or functionally connected to a component of the electronic device 300, such as the communication module 320 and/or the memory 340.

The processor 330 may detect a device connected to the electronic device 300. For example, the processor 330 may detect whether a keyboard, a mouse, a speaker, a headset, or/and an external electronic device is connected to the electronic device 300. According to one or more embodiments, the processor 330 may further identify a communication scheme (e.g., BT/BLE or WLAN) in which each device is connected.

The processor 330 may detect whether an application or a service of the electronic device 300 is executed. According to one or more embodiments, the processor 330 may execute an application stored in the memory 340, and may detect an execution state of the application. The processor 330 may identify whether the detected application uses the network. When the detected application uses the network, the processor 330 may identify a used communication scheme. For example, the processor 330 may identify whether a communication scheme used by the application is a WLAN or BT/BLE. According to one or more embodiments, the processor 330 may further identify information including a category of the detected application or authority to execute the application.

The processor 330 may monitor data traffic transmitted and received by the electronic device 300 to and from the network. According to one or more embodiments, the processor 330 may identify and analyze information about data traffic transmitted and received via the communication module 320 during communication with the network. According to one or more embodiments, the information about the data traffic may be a certain parameter or a set of parameters relating to the data traffic. According to one or more embodiments, the processor 330 may monitor data traffic related to an application currently being executed, or may monitor data traffic of the electronic device 300 regardless of an application being executed.

According to one or more embodiments, the processor 330 may identify the type of a package currently being executed or the state of a connected network, and may identify a plurality of parameter values including a coexistence state of different networks (e.g., BL/BLE, WLAN, and/or UWB), the number of packets transmitted/received per time, the size of a packet, the protocol of a packet (e.g., a transmission control protocol (TCP) or a user datagram protocol (UDP)), a packet reception interval, the bandwidth of a packet, a round-trip time (RTT), retransmission, and/or noise. According to one or more embodiments, the processor 330 may generate a new parameter value by combining the detected parameter values or reprocessing a parameter value, and may identify the new parameter value. For example, the processor 330 may apply a weight to some parameter values. The processor 330 may monitor data traffic, and may store parameter values related to the identified data traffic in the memory 340 of the electronic device 300.

The processor 330 may detect a data traffic pattern, based on a plurality of identified parameter values. According to one or more embodiments, the processor 330 may detect a traffic pattern, based on at least one of the plurality of identified parameters. According to one or more embodiments, a traffic pattern may be based on a set of a plurality of parameter values. For example, the processor 330 may use at least one of the plurality of parameter values to identify a specific traffic pattern. According to one or more embodiments, the processor 330 may detect a traffic pattern, based on a threshold value for a parameter previously stored in the memory 340 of the electronic device 300. According to one or more embodiments, the processor 330 may store condition parameter values for a predetermined pattern in the memory 340, and may detect the predetermined traffic pattern when the parameter values for the identified data traffic satisfy the condition parameters. There may be a plurality of traffic patterns.

According to one or more embodiments, the processor 330 may identify data traffic parameter values, and may estimate a network requirement required for traffic, based on the data traffic parameter values. According to one or more embodiments, the processor 330 may recognize a current traffic pattern as a pattern requiring low latency, based on at least one parameter value. For example, when a user data protocol (UDP) packet is used and the period of the packet is relatively short, the packet may be recognized as a pattern requiring low latency. According to one or more embodiments, the processor 330 may recognize the pattern as a pattern requiring high throughput.

According to one or more embodiments, the processor 330 may adjust a configuration of a plurality of types of communication schemes using the same frequency band or using an overlapping portion of the frequency bands. For example, the processor 330 may adjust a configuration (e.g., Nsniff attempt or Nsniff timeout) of the WLAN and BT/BLE communication schemes using the same frequency band or using an overlapping portion of the frequency bands. In another example, even when the WLAN and UWB communication schemes use the same frequency band or use an overlapping portion of the frequency bands, the processor 330 may adjust a configuration of the communication schemes.

The memory 340 may store various types of data used by the electronic device 300. According to one or more embodiments, the memory 340 stores data, and may include at least one of components and/or functions of the memory 130 of FIG. 1. The data may include, for example, software (e.g., the program 140) and input data or output data about a command related to the software. According to an embodiment, the memory 340 may store instructions that, when executed, cause the processor 330 to operate.

Figure 4A:
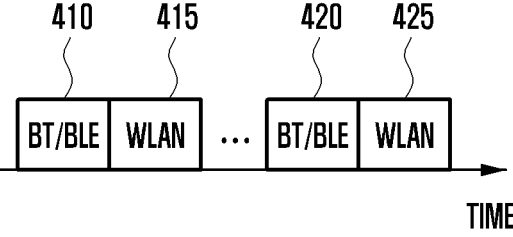
FIG. 4A to FIG. 4C illustrate an example in which a plurality of communication schemes use the same frequency.
Figure 4B:
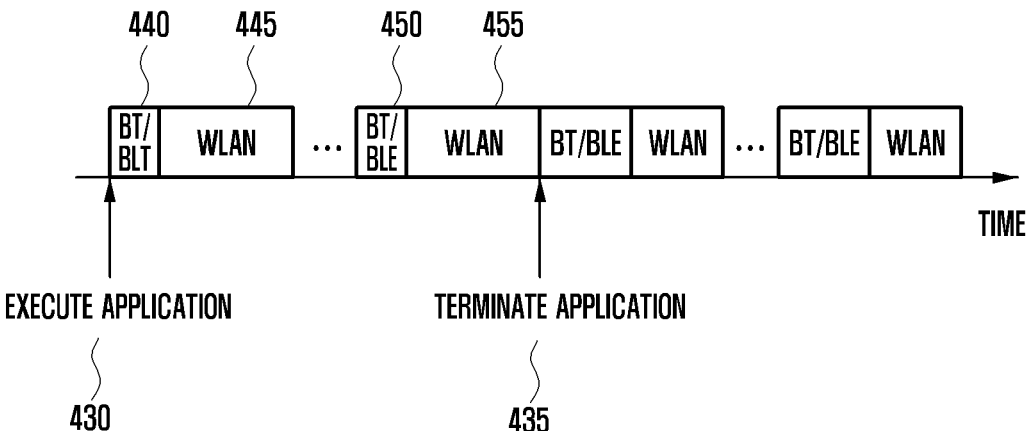
Figure 4C:
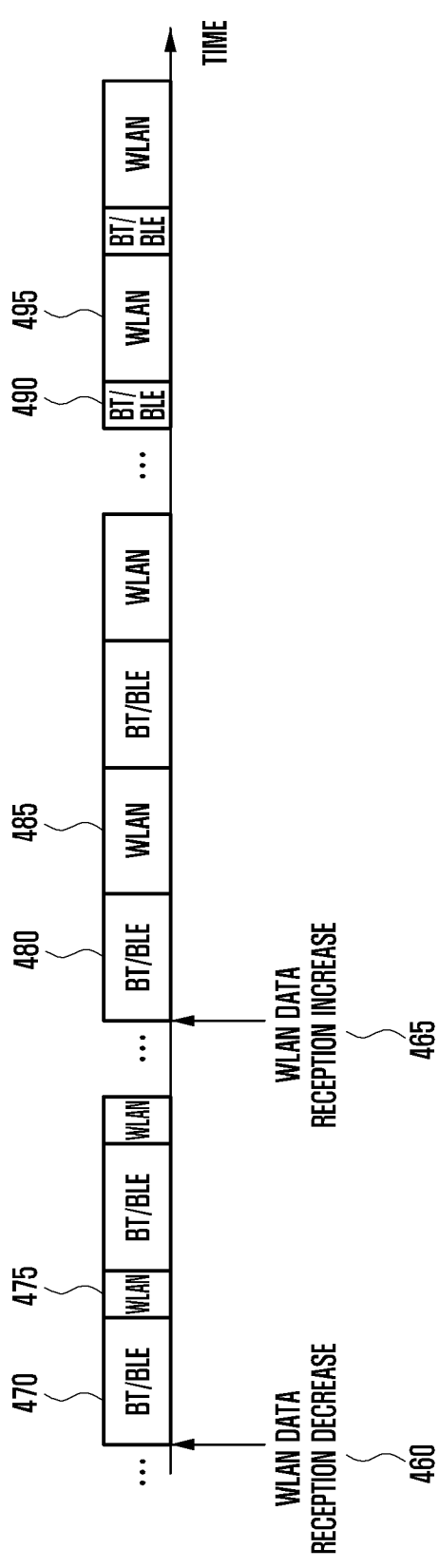

FIG. 4A to FIG. 4C illustrate an example in which a plurality of communication schemes use the same frequency band or use an overlapping portion of the frequency bands.

According to one or more embodiments, an electronic device (e.g., the electronic device 300 of FIG. 3) may simultaneously use a WLAN communication scheme and a BT/BLE communication scheme. For example, the electronic device 300 may download music or video by accessing a website using the WLAN communication scheme in order to provide a streaming service for a user, and may simultaneously output a sound to a headset connected for communication to the electronic device 300 using the BT/BLE communication scheme.

According to one or more embodiments, both the WLAN communication scheme and the BT/BLE communication scheme may use the 2.4 GHz frequency band or use a portion of the frequency band, and may share an antenna. Referring to FIG. 4A, the antenna may be alternately used by the BT/BLE communication scheme and the WLAN communication scheme. The electronic device 300 may use the antenna for the BT/BLE communication scheme for a certain time (time periods 410 and 420), and may then use the antenna for a WLAN communication scheme (time periods 415 and 425). For example, the electronic device 300 may use the antenna to receive data from the website for a certain time (time periods 415 and 425), and may then use the antenna to transmit data to the headset (time periods 410 and 420). For example, time periods 410 and 420 (e.g., 30 seconds) when the antenna is used for the BT/BLE communication scheme and time periods 415 and 425 (e.g., 30 seconds) when the antenna is used for the WLAN communication scheme may be the same. Hereinafter, a time may mean an amount of time.

Referring to FIG. 4B, the electronic device 300 may execute an application (time period 430). For example, the application may be an application using the WLAN communication scheme, and may require low latency. The electronic device 300 may adjust a time when each communication scheme uses the antenna due to execution of the application. The electronic device 300 may increase the times when the antenna is used for the WLAN communication scheme (time periods 445 and 455), and may reduce the times when the antenna is used for the BT/BLE communication scheme (time periods 440 and 450).

According to one or more embodiments, when the execution of the application ends (time period 435), the electronic device 300 may adjust the time when each communication scheme uses the antenna. For example, the electronic device 300 may equally adjust the time periods 410 and 420 when the antenna is used for the BT/BLE communication scheme and the time periods 415 and 425 when the antenna is used for the WLAN communication scheme as shown in FIG. 4A.

Referring to FIG. 4C, data reception using the WLAN communication scheme may decrease (time period 460). When WLAN data reception decreases (time period 460), the electronic device 300 may adjust the time when each communication scheme uses the antenna. For example, compared to FIG. 4A, the electronic device 300 may maintain a time when the BT/BLE communication scheme uses the antenna (time period 470), and may reduce a time when the WLAN communication scheme uses the antenna (time period 475). According to another embodiment, the electronic device 300 may increase the time when the BT/BLE communication scheme uses the antenna, and may reduce the time when the WLAN communication scheme uses the antenna.

According to one or more embodiments, data reception using the WLAN communication scheme may increase, again (time period 465). When WLAN data reception increases (time period 465), the electronic device 300 may adjust the time when each communication scheme uses the antenna. For example, the electronic device 300 may increase the time when the WLAN communication scheme uses the antenna (time period 485) without changing the time when the BT/BLE communication scheme uses the antenna (time period 480). Alternatively, the electronic device 300 may reduce the time (time period 490) when the BT/BLE communication scheme uses the antenna, and may increase the time (time period 495) when the WLAN communication scheme uses the antenna.

According to one or more embodiments, the electronic device 300 may detect an application being executed and/or a connected device, may determine a used communication scheme, and may monitor the amount of data transmitted and received. The electronic device 300 may change a configuration of the communication scheme to adjust a time when the communication scheme uses the antenna.

Figure 5:
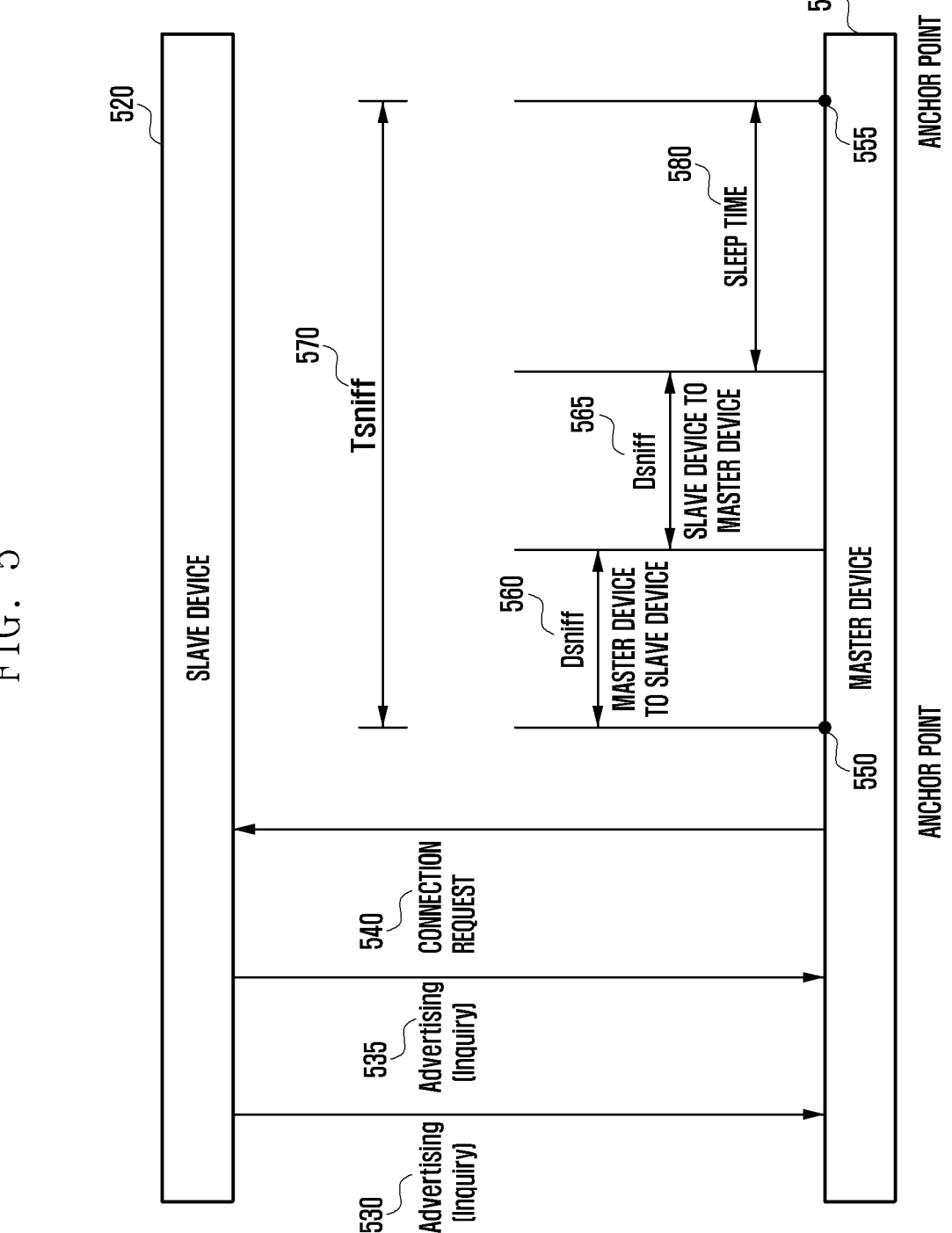
FIG. 5 illustrates an example of using a Bluetooth/Bluetooth Low Energy (BT/BLE) communication scheme.

FIG. 5 illustrates an example of using a BT/BLE communication scheme.

According to one or more embodiments, a network using the BT/BLE communication scheme may include a master device 510 and a slave device 520. A plurality of slave devices 520 may be connected to one master device 510. The master device 510 may transmit data to each of the plurality of slave devices 520 and may receive data from each of the plurality of slave devices 520, but the plurality of slave devices 520 may not transmit or receive data to and from each other.

According to one or more embodiments, an electronic device using the BT/BLE communication scheme may be operated or included in a plurality of BT/BLE networks, and may play a role (e.g., a master or a slave) in each BT/BLE network. For example, when the electronic device 300 is operated or included in a first BT/BLE network and a second BT/BLE network, the electronic device 300 may operate as a master device in the first BT/BLE network, and may operate as a slave device in the second BT/BLE network.

According to one or more embodiments, when the slave device 520 is not connected to the master device 510, the slave device 520 may transmit a signal (e.g., advertising or inquiry) to find the master device 510 (time periods 530 and 535). The slave device 520 may periodically transmit the signal for finding the master device 510.

According to one or more embodiments, the master device 510 may transmit a connection request signal (e.g., a connection request) to the slave device 520, based on the signal transmitted by the slave device 520 (time period 540). When the master device 510 and the slave device 520 are connected using the BT/BLE communication scheme, the master device 510 may configure a mode of the slave device 520. The slave device 520 may be configured to one of (i) an active mode, (ii) a sniff mode, (iii) a hold mode, and (iv) a park mode by the master device 510.

The active mode is a normal connection state, in which there may be no restriction in transmitting and receiving data between the master device 510 and the slave device 520. The sniff mode is a power saving mode, in which a sleep state may be maintained and data is transmitted and received by identifying whether there is data to be transmitted or received in a predetermined time interval.

The master device 510 may configure and change a value of a variable (e.g., Tsniff, Nsniff attempt, and/or Nsniff timeout of FIG. 6) of the sniff mode in the slave device 520. When connected with a plurality of slave devices, the master device 510 may configure and change a value of a variable of the sniff mode in each slave device.

The hold mode is a temporary power saving mode, in which the sleep state may be maintained for a predetermined period and is then changed to an active state. The park mode is a still mode, in which only a channel synchronization state may be maintained, in which the slave device 520 may receive only a beacon from the master device (510).

According to one or more embodiments, when the master device 510 uses a different communication scheme simultaneously with the BT/BLE communication scheme or when a plurality of devices using the BT/BLE communication scheme is connected, the sniff mode may be used. Hereinafter, the sniff mode will be described in detail.

According to one or more embodiments, in the sniff mode, anchor points 550 and 555 may refer to a slot boundary defining a period for which the slave device 520 receives a packet from the master device 510. The period for which the slave device 520 receives the packet from the master device 510 may be defined as Tsniff 570, and may be configured to, for example, one hundred (100) ms.

According to one or more embodiments, the master device 510 may transmit data to the slave device 520 at an anchor point 550. A time period 560 required for the data transmitted by the master device 510 to reach the slave device 520 may be defined as 'Dsniff.' In addition, the slave device 520 may transmit data to the master device 510, and a time period 565 required for the data transmitted by the slave device 520 to reach the master device 510 may also be 'Dsniff.' Dsniff may be proportional to a distance between the master device 510 and the slave device 520.

According to one or more embodiments, 'Nsniff attempt' may refer to the number of times the master device 510 transmits a packet to the slave device 520, based on the anchor points 550 and 555, and 'Nsniff timeout' may refer to a time in which the slave device 520 waits for a next packet to be transmitted after receiving the last packet. The master device 510 may transmit data in Nsniff timeout, and may switch to the sleep state when there is no data to be transmitted. The slave device 520 may not switch to the sleep state because the master device 510 may transmit data during Nsniff timeout.

According to one or more embodiments, in the sniff mode of the BT/BLE communication scheme, a sleep time 580 may be determined by Dsniff and Tsniff 570. Nsniff attempt and Nsniff timeout may be changed by configuration, and may thus, be used to adjust the sleep time 580. For example, the sleep time 580 may increase by reducing Nsniff attempt and decreasing Nsniff timeout. According to one or more embodiments, the master device 510 may use a communication scheme other than the BT/BLE communication scheme or a BT/BLE communication scheme of another slave device during the sleep time 580.

Figure 6:
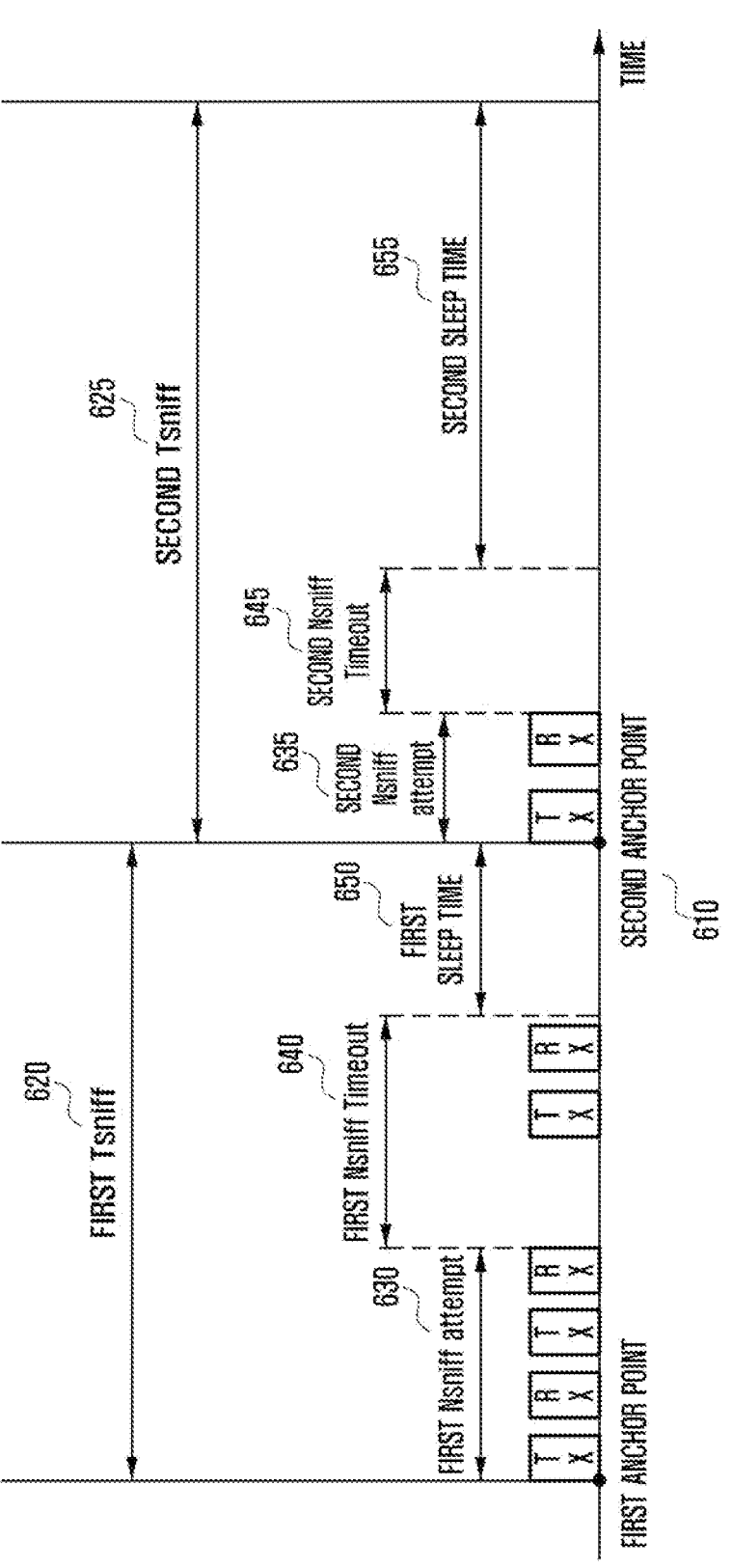
FIG. 6 illustrates an example of adjusting a sleep time in a BT/BLE communication scheme according to one or more embodiments.

FIG. 6 illustrates an example of adjusting a sleep time in a BT/BLE communication scheme according to one or more embodiments. FIG. 6 is from the perspective of a master device (e.g., the master device 510 of FIG. 5).

Referring to FIG. 6, the master device 510 may change a configuration related to a sniff mode before a second anchor point 610. Before the configuration related to the sniff mode is changed, first Tsniff 620 may be configured to three hundreds (300) (ms), first Nsniff attempt 630 may be configured to two (2) (number of slots), and first Nsniff timeout 640 may be configured to one hundred (100) (ms). When first Nsniff attempt 630 takes one hundred (100) (ms), a first sleep time 650 may be first Tsniff 620–time taken for first Nsniff attempt 630–first Nsniff timeout 640=300 (ms)–100 (ms)–100 (ms)=one hundred (100) (ms). For reference, one slot may be fifty (50) (ms).

According to one or more embodiments, the master device 510 may change the configuration related to the sniff mode such that second Tsniff 625 is five hundreds (500) (ms), second Nsniff attempt 635 is one (1), and second Nsniff timeout 645 is fifty (50) (ms). As the configuration related to the sniff mode is changed, a second sleep time 655 may also be changed. The second sleep time 655 may be second Tsniff 625–time taken for second Nsniff attempt 635–second Nsniff timeout 645=500 (ms)–50 (ms)–50 (ms) =four hundreds (400) (ms).

According to one or more embodiments, the master device 510 may use a communication scheme other than the BT/BLE communication scheme or a BT/BLE communication scheme of another slave device during the sleep times 650 and 655. For example, when an application using a WLAN communication scheme and requiring low latency is executed, the master device 510 may increase the sleep times 650 and 655 (as described above), and may use the WLAN communication scheme during the sleep times 650 and 655.

According to one or more embodiments, the master device 510 may adjust at least one of Tsniff, Nsniff attempt, and Nsniff timeout to adjust the sleep times 650 and 655. For example, the master device 510 may increase Tsniff, may reduce Nsniff attempt, or/and may reduce Nsniff timeout in order to increase the sleep times 650 and 655. In an alternative embodiment, the master device 510 may reduce Tsniff, may increase Nsniff attempt, or/and may increase Nsniff timeout in order to reduce the sleep times 650 and 655.

According to one or more embodiments, when determining that a low-latency network is not required but high-capacity WLAN data is required, the master device 510 may increase Tsniff, may reduce Nsniff attempt, or/and may reduce Nsniff timeout. In another example, when determining that a low-latency network is not required and WLAN data is not used, the master device 510 may switch to an active mode.

Figure 7A:
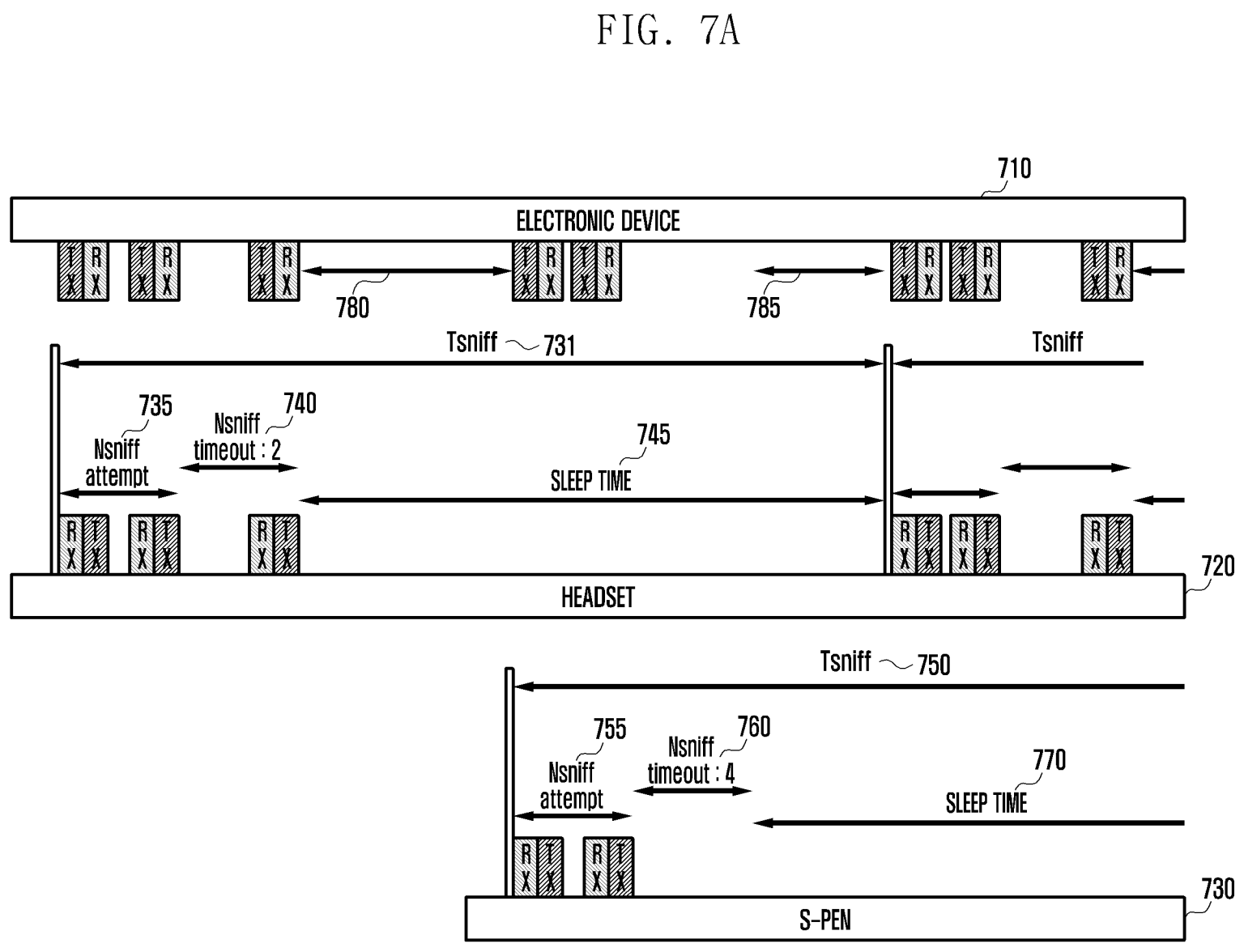
Figure 7B:
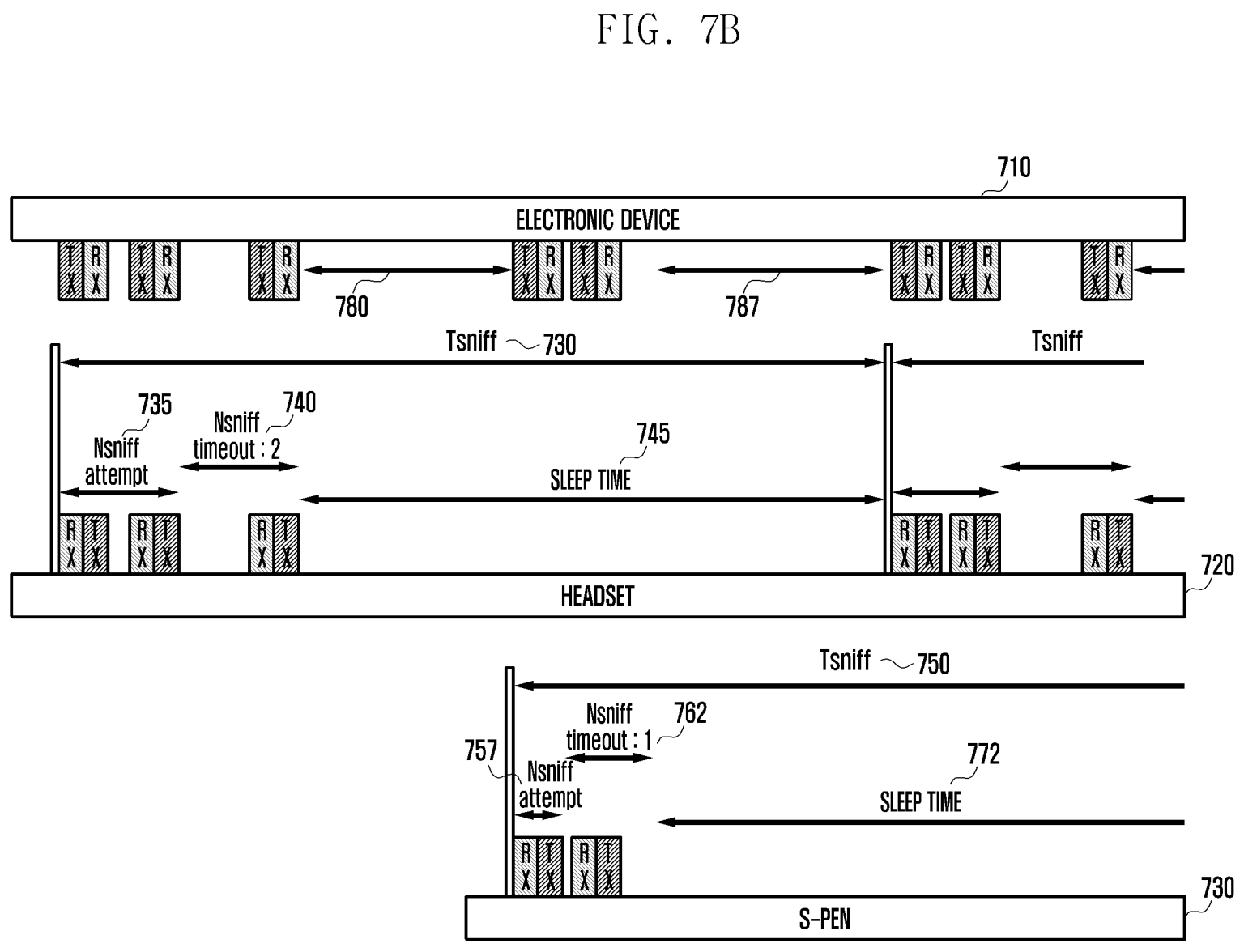

FIG. 7A and FIG. 7B illustrate an example of adjusting sleep times of a plurality of electronic devices connected using a BT/BLE communication scheme according to one or more embodiments.

According to one or more embodiments, an electronic device 710 (e.g., the master device 510 of FIG. 5) may be in a state of being connected to a headset 720 and an S-pen 730 via the BT/BLE communication scheme. The electronic device 710 may configure the headset 720 and the S-pen 730 to a sniff mode, and may transmit and receive data to and from the headset 720 or the S-pen 730.

Referring to FIG. 7A, the electronic device 710 may configure Tsniff 731 to two hundreds (200) (ms), Nsniff attempt 735 to two (2), and Nsniff timeout 740 to 2 in the sniff mode of the headset 720. The electronic device 710 may transmit and receive data to and from a different electronic device within a sleep time 745 of the headset 720. For example, the electronic device 710 may transmit and receive data to and from the S-pen 730 within the sleep time 745 of the headset 720. The electronic device 710 may configure the sniff mode of the S-pen 730 to transmit and receive data to and from the S-pen 730. The electronic device 710 may configure Tsniff 750 to five hundreds (500) (ms), Nsniff attempt 755 to two (2), and Nsniff timeout 760 to four (4) in the sniff mode of the S-pen 730.

According to one or more embodiments, when both the headset 720 and the S-pen 730 are in sleep times 780 and

785, the electronic device 710 may transmit and receive data to and from a different electronic device by using a WLAN communication scheme.

FIG. 7B illustrates a sleep time 772 changed by at least partly changing a configuration of the sniff mode of the S-pen 730. For example, the electronic device 710 may change both Nsniff attempt 757 and Nsniff timeout 762 to one (1) in the configuration of the sniff mode of the S-pen 730. As both Nsniff attempt 757 and Nsniff timeout 762 of the S-pen 730 are changed, the sleep time 772 may also be changed. Referring to FIG. 8, both Nsniff attempt 757 and Nsniff timeout 762 may be reduced, and thus, the sleep time 772 may be increased.

According to one or more embodiments, as the sleep time 772 of the S-pen 730 increases, a time during which both the headset 720 and the S-pen 730 are in a sleep time 787 may also increase. When both the headset 720 and the S-pen 730 are in the sleep time 787, the electronic device 710 may transmit and receive data to and from a different electronic device by using the WLAN communication scheme. In an alternative embodiment, the electronic device 710 may transmit and receive data to and from a different external device by using the BT/BLE communication scheme.

Referring to FIG. 7B, the electronic device 710 may change only the configuration of the sniff mode of the S-pen 730, thereby providing a different service or improving the performance of a different service while maintaining the performance of the headset 720.

Figure 8A:
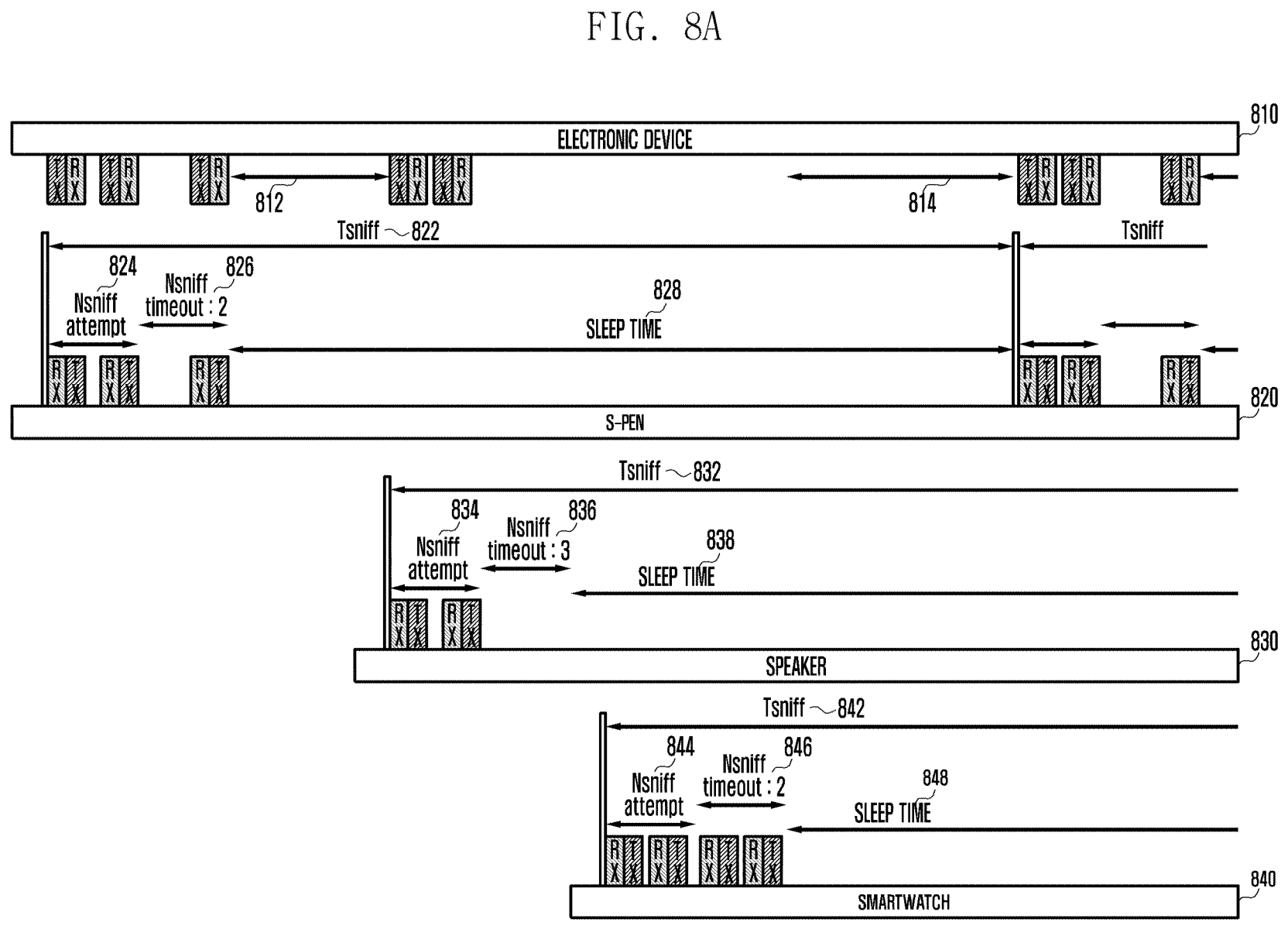
Figure 8B:
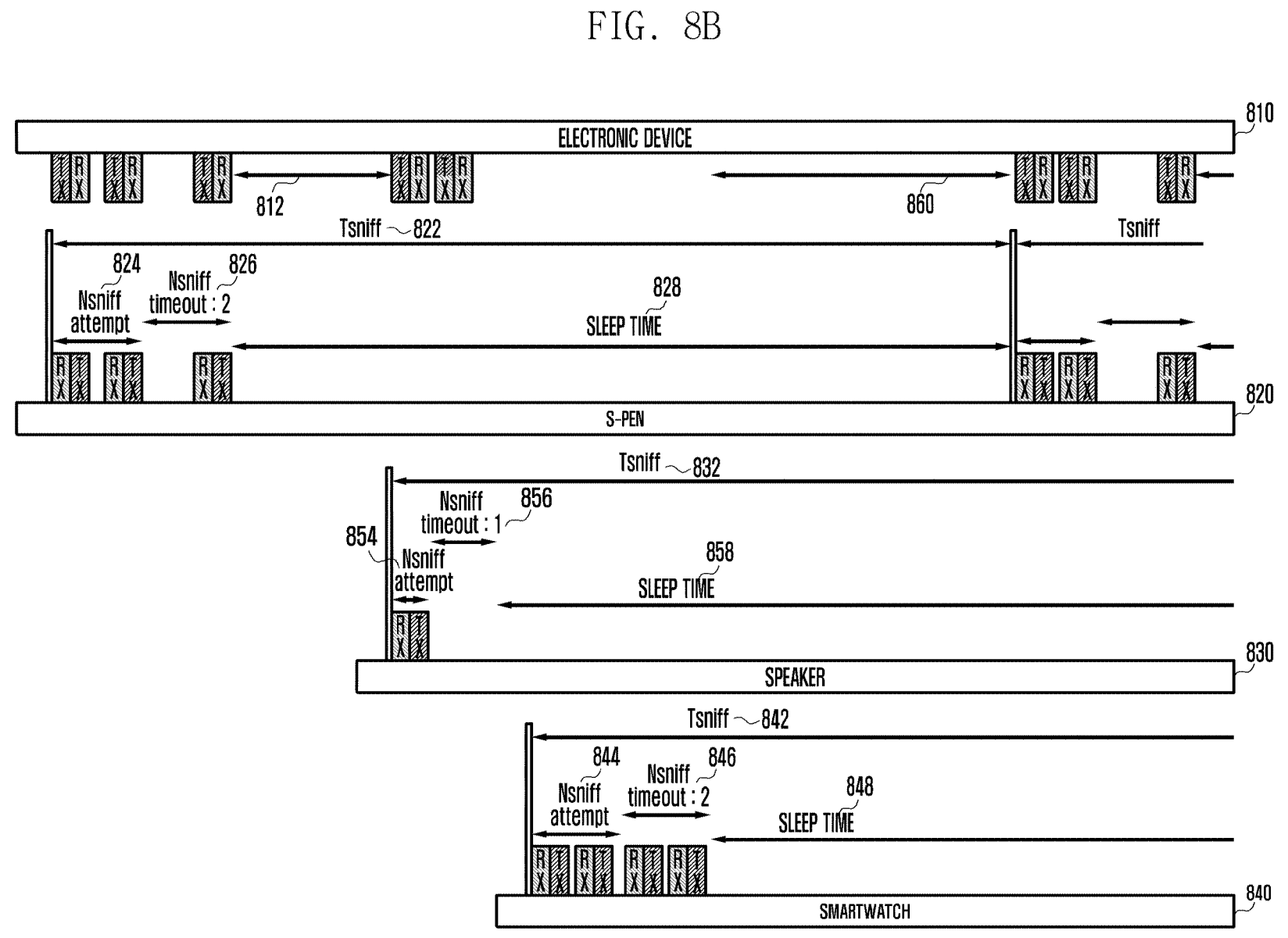

FIG. 8A and FIG. 8B illustrate another example of adjusting sleep times of a plurality of electronic devices connected using a BT/BLE communication scheme according to one or more embodiments.

Referring to FIG. 8A, an electronic device 810 may be connected to an S-pen 820, a speaker 830, and a smartwatch 840 via the BT/BLE communication scheme. The electronic device 810 may configure the S-pen 820, the speaker 830, and the smartwatch 840 to a sniff mode, and may transmit or receive to and from the S-pen 820, the speaker 830, or the smartwatch 840.

Referring to FIG. 8A, the electronic device 810 may configure Tsniff 822 to two hundreds (200) (ms), Nsniff attempt 824 to two (2), and Nsniff timeout 826 to two (2) in the sniff mode of the S-pen 820. The electronic device 810 may transmit and receive data to and from a different electronic device within a sleep time 828 of the S-pen 820. For example, the electronic device 810 may transmit and receive data to and from the speaker 830 or the smartwatch 840 within the sleep time 828 of the S-pen 820.

According to one or more embodiments, the electronic device 810 may configure Tsniff 832 to five hundreds (500) (ms), Nsniff attempt 834 to two (2), and Nsniff timeout 836 to three (3) in the sniff mode of the speaker 830. The electronic device 810 may transmit and receive data to and from a different electronic device within a sleep time 838 of the speaker 830. For example, the electronic device 810 may transmit and receive data to and from the smartwatch 840 within the sleep time 838 of the speaker 830.

According to one or more embodiments, the electronic device 810 may configure Tsniff 842 to eight hundreds (800) (ms), Nsniff attempt 844 to two (2), and Nsniff timeout 846 to two (2) in the sniff mode of the smartwatch 840. The electronic device 810 may transmit and receive data to and from a different electronic device within a sleep time 848 of the smartwatch 840.

According to one or more embodiments, the electronic device 810 may adjust Tsniff, Nsniff attempts, and Nsniff timeout of each electronic device (the S-pen 820, the speaker

830, or the smartwatch 840) in consideration of or based on the amount of data to be transmitted and received and a transmission and reception period.

According to one or more embodiments, when a device connected via the BT/BLE communication scheme is in a sleep time, the electronic device 810 may transmit and receive data to and from a different electronic device by using the WLAN communication scheme. For example, when all of the S-pen 820, the speaker 830, and the smartwatch 840 connected via the BT/BLE communication scheme are in the sleep times 812 and 814, the electronic device 810 may transmit and receive data to and from a different electronic device by using the WLAN communication scheme.

FIG. 8B illustrates, for example, a sleep time 858 changed by at least partly changing a configuration of the sniff mode of the speaker 830. For example, the electronic device 810 may change both Nsniff attempt 854 and Nsniff timeout 856 to one (1) in the configuration of the sniff mode of the speaker 830. Although Tsniff 832 of the speaker 830 is not changed, Nsniff attempt 854 and Nsniff timeout 856 are changed, and thus, the sleep time 858 may also be changed. Referring to FIG. 8B, both Nsniff attempt 854 and Nsniff timeout 856 may be reduced, and thus, the sleep time 858 may be increased.

According to one or more embodiments, as the sleep time 858 of the speaker 830 increases, a time during which both the S-pen 820 and the smartwatch 840 are in a sleep time 860 may also increase. When all of the S-pen 820, the speaker 830, and the smartwatch 840 are in the sleep time 860, the electronic device 810 may transmit and receive data to and from a different electronic device by using the WLAN communication scheme. Alternatively, the electronic device 810 may transmit and receive data to and from a different external device by using the BT/BLE communication scheme.

Figure 9:
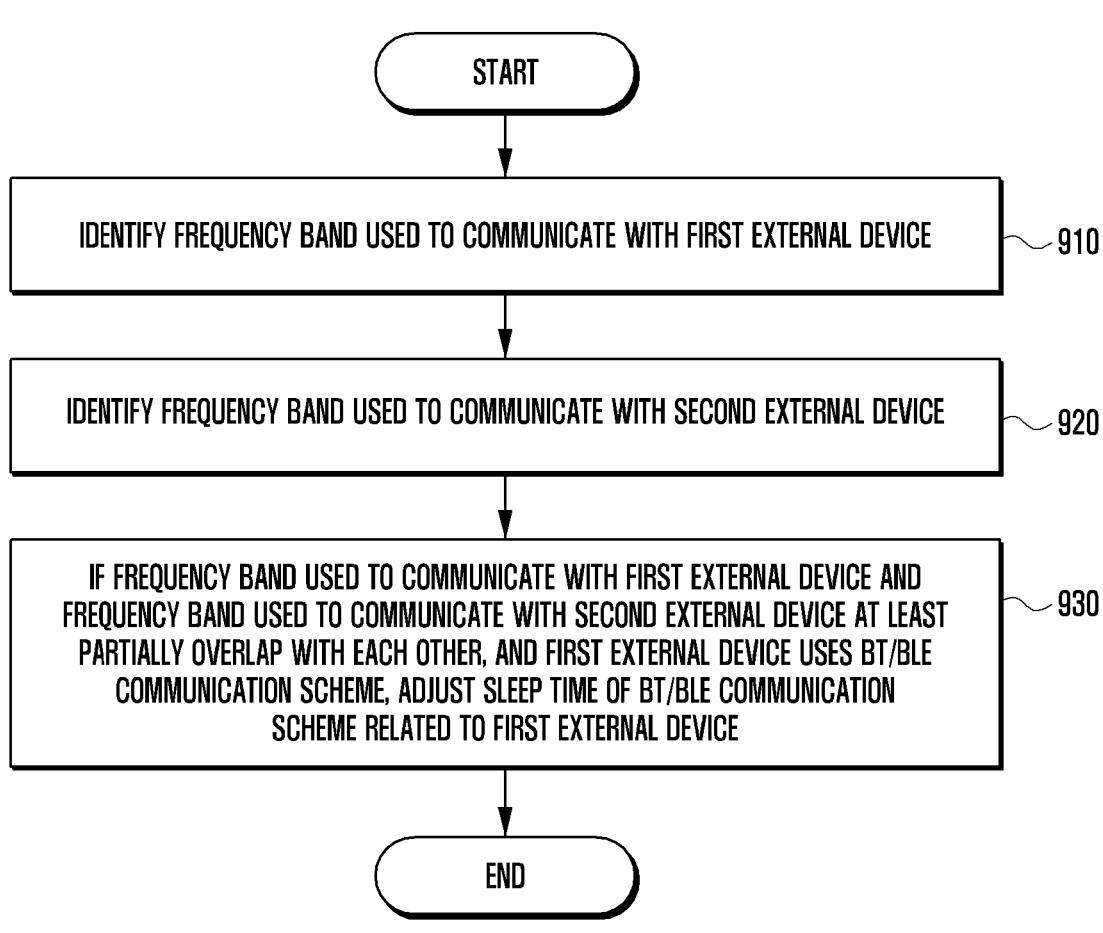
FIG. 9 is a flowchart of an electronic device according to one or more embodiments.

FIG. 9 is a flowchart of an electronic device according to one or more embodiments.

According to one or more embodiments, the electronic device (e.g., the electronic device 300 of FIG. 3) may identify a frequency band used for communicating with a first external device in operation 910. The electronic device 300 may be connected to the first external device via a BT/BLE communication scheme. The BT/BLE communication scheme may use a frequency band of 2.4 GHz. According to one or more embodiments, the electronic device 300 may be a master device, and the first external device may be a slave device. The first external device may be, for example, one of a headset, an S-pen, a smartwatch, a keyboard, a mouse, a joystick, a game pad, a selfie stick, a tablet PC, a smart health device, a printer, or a scanner.

According to one or more embodiments, in operation 920, the electronic device 300 may identify a frequency band used for communicating with a second external device. For example, the second external device may also be, for example, one of a headset, an S-pen, a smartwatch, a keyboard, a mouse, a joystick, a game pad, a selfie stick, a tablet PC, a smart health device, a printer, or a scanner.

According to one or more embodiments, the electronic device 300 may also be connected to the second external device via the BT/BLE communication scheme. According to one or more embodiments, the electronic device 300 may be a master device, and the second external device may be a slave device.

According to one or more embodiments, the electronic device 300 may be connected to the second external device via a WLAN communication scheme. The WLAN communication scheme may use a frequency band of 2.4 GHz/5 GHz. The second external device may be, for example, one of an access point (AP) and a different electronic device (e.g., the electronic device 102 of FIG. 1).

According to one or more embodiments, in operation 930, when the frequency band used for communicating with the first external device and the frequency band used for communicating with the second external device at least partially overlap and the first external device uses a first communication scheme (e.g., the BT/BLE communication scheme), the electronic device 300 may adjust a sleep time of the first communication scheme associated with the first external device.

When the first external device and the second external device are connected to the electronic device 300 via the first communication scheme (e.g., the BT/BLE communication scheme), the frequency bands used for communication may be the same or at least partially overlapping. In addition, even when the first external device is connected to the electronic device 300 via first communication scheme (e.g., the BT/BLE communication scheme) and the second external device is connected via a second communication scheme (e.g., the WLAN communication scheme), both devices may use the 2.4 GHz frequency band for communication, and thus, the frequency bands may at least partly overlap. The electronic device 300 may adjust a sleep time of an external device using the first communication scheme (e.g., the BT/BLE communication scheme), thereby securing or increasing a time for a different external device to communicate with the electronic device 300.

According to one or more embodiments, the electronic device 300 may adjust at least one of Tsniff, Nsniff attempt, and Nsniff timeout to control the sleep time of the first communication scheme (e.g., the BT/BLE communication scheme).

The electronic device 300 may adjust the sleep time in consideration of or based on the type of an external device connected via the first communication scheme (e.g., the BT/BLE communication scheme). The electronic device 300 may refer to a profile used by the external device to consider the external device. For example, a headset may use an advanced audio distribution profile (A2DP) that is sensitive to latency. When the headset is connected as the external device, the electronic device 300 may not adjust the sleep time because the headset is sensitive to latency.

In another example, when an S-pen or watch is connected as the external device, the electronic device 300 may adjust the sleep time because the S-pen or watch is not sensitive to latency. According to one or more embodiments, when the external device uses a hands-free profile (HFP), a headset profile (HSP), an A2DP, an audio/video remote control profile (AVRCP), a generic access profile (GAP), and a generic audio/video distribution profile (GAVDP), the electronic device 300 may not adjust the sleep time. Here, the HFP may a profile for communication with a mobile phone to transmit or receive and control a phone voice, and the HSP may be a profile supporting an audio. The A2DP may be a profile supporting high-quality stereo audio streaming, and AVRCP may be a profile supporting a basic remote control command. The GAP may be a profile that needs to be basically applied to operate a Bluetooth profile, and the GAVDP may be a profile that needs to be basically applied to operate the A2DP and a video distribution profile (VDP). When the external device uses a human interface device profile (HID), the electronic device 300 may partially adjust the sleep time at a level that does not degrade usability, if necessary. The HID may be a profile supporting an interface for a keyboard, a mouse, multimedia, or a joystick.

According to one or more embodiments, a priority may be assigned for an external device connectable to the electronic device 300. The priority may be determined in consideration of at least one of the type of the external device, a used profile, and a used communication scheme. The electronic device 300 may adjust the sleep time of the first communication scheme (e.g., the BT/BLE communication scheme) in consideration of or based on the priority of the external device.

According to one or more embodiments, the electronic device 300 may monitor data transmitted to and received from the first external device and data transmitted to and received from the second external device. The electronic device 300 may monitor, for example, application packet information, an action of a user (e.g., a touch), the number of packets transmitted and received per specific period, the size of a packet, a round-trip time (RTT), noise, or the state of the electronic device. The electronic device 300 may determine, based on a monitoring result, whether the electronic device 300 transmits and receives data requiring low latency to and from the external device and/or transmits and receives large-capacity data. The electronic device 300 may adjust the sleep time of the first communication scheme (e.g., the BT/BLE communication scheme), based on a determination result or the determination on whether the electronic device 300 transmits and receives data requiring low latency to and from the external device and/or transmits and receives large-capacity data.

An electronic device (e.g., the electronic device 101 of FIG. 1 or the electronic device 300 of FIG. 3) according to one or more embodiments of the disclosure may include a communication module (e.g., the communication module 190 of FIG. 1 or the communication module 320 of FIG. 3) configured to support communication with a first external device (e.g., the headset 720 or the S-pen 730 of FIG. 7A) and a second external device (e.g., the headset 720 or the S-pen 730 of FIG. 7A) and a processor (e.g., the processor 120 of FIG. 1 or the processor 330 of FIG. 3) configured to be operatively connected to the communication module, wherein the processor 330 may identify a frequency band used for communicating with the first external device, may identify a frequency band used for communicating with the second external device, and may adjust a sleep time of a Bluetooth (BT)/Bluetooth Low Energy (BLE) communication scheme associated with the first external device when the frequency band used for communicating with the first external device and the frequency band used for communicating with the second external device at least partially overlap and the first external device uses the BT/BLE communication scheme.

The processor 330 of the electronic device according to one or more embodiments of the disclosure may adjust at least one of Tsniff, Nsniff attempt, and Nsniff timeout to control the sleep time of the BT/BLE communication scheme.

The processor 330 of the electronic device according to one or more embodiments of the disclosure may adjust at least one of Tsniff interval, Nsniff attempt, and Nsniff timeout to control the sleep time of the BT/BLE communication scheme in consideration of a type of the first external device and a type of the second external device.

In the electronic device 300 according to one or more embodiments of the disclosure, the second external device may use the BT/BLE communication scheme with the electronic device.

The processor 330 of the electronic device according to one or more embodiments of the disclosure may further control a sleep time of the BT/BLE communication scheme associated with the second external device.

The processor 330 of the electronic device according to one or more embodiments of the disclosure may further adjust the sleep time of the BT/BLE communication scheme associated with the first external device and the sleep time of the BT/BLE communication scheme associated with the second external device, based on a priority of the first external device and a priority of the second external device.

In the electronic device 300 according to one or more embodiments of the disclosure, the second external device may use a wireless local area network (WLAN) communication scheme with the electronic device.

The processor 330 of the electronic device according to one or more embodiments of the disclosure may monitor data transmitted to and received from the first external device, and may further adjust the sleep time of the BT/BLE communication scheme associated with the first external device, based on a monitoring result.

The processor 330 of the electronic device according to one or more embodiments of the disclosure may monitor data transmitted to and received from the second external device, and may further adjust the sleep time of the BT/BLE communication scheme associated with the first external device, based on a monitoring result.

The processor 330 of the electronic device according to one or more embodiments of the disclosure may determine whether the data transmitted to and received from the second external device is data requiring low latency or high-capacity data, and may further adjust the sleep time of the BT/BLE communication scheme associated with the first external device, based on a determination result.

A operating method of the electronic device 300 according to one or more embodiments of the disclosure may include an operation 910 of identifying a frequency band used for communicating with a first external device 810, an operation 920 of identifying a frequency band used for communicating with a second external device, and an operation 930 of adjusting a sleep time of a Bluetooth (BT)/ Bluetooth Low Energy (BLE) communication scheme associated with the first external device when the frequency band used for communicating with the first external device and the frequency band used for communicating with the second external device at least partially overlap and the first external device uses the BT/BLE communication scheme.

In the operating method of the electronic device according to one or more embodiments of the disclosure, the operation 930 of adjusting the sleep time of the BT/BLE communication scheme associated with the first external device may include an operation of adjusting at least one of Tsniff, Nsniff attempt, and Nsniff timeout to adjust the sleep time of the BT/BLE communication scheme.

In the operating method of the electronic device according to one or more embodiments of the disclosure, the operation 930 of adjusting the sleep time of the BT/BLE communication scheme associated with the first external device may include an operation of adjusting at least one of Tsniff interval, Nsniff attempt, and Nsniff timeout to adjust the sleep time of the BT/BLE communication scheme in consideration of a type of the first external device and a type of the second external device.

In the operating method of the electronic device according to one or more embodiments of the disclosure, the second external device may use the BT/BLE communication scheme with the electronic device.

The operating method of the electronic device according to one or more embodiments of the disclosure may further include an operation of adjusting a sleep time of the BT/BLE communication scheme associated with the second external device.

The operating method of the electronic device according to one or more embodiments of the disclosure may further include an operation of adjusting the sleep time of the BT/BLE communication scheme associated with the first external device and the sleep time of the BT/BLE communication scheme associated with the second external device, based on a priority of the first external device and a priority of the second external device.

In the operating method of the electronic device according to one or more embodiments of the disclosure, the second external device uses a wireless local area network (WLAN) communication scheme with the electronic device.

The operating method of the electronic device according to one or more embodiments of the disclosure may further include an operation of monitoring data transmitted to and received from the first external device, and an operation of adjusting the sleep time of the BT/BLE communication scheme associated with the first external device, based on a monitoring result.

The operating method of the electronic device according to one or more embodiments of the disclosure may further include an operation of monitoring data transmitted to and received from the second external device, and an operation of adjusting the sleep time of the BT/BLE communication scheme associated with the first external device, based on a monitoring result.

The operating method of the electronic device according to one or more embodiments of the disclosure may further include an operation of determining whether the data transmitted to and received from the second external device is data requiring low latency or high-capacity data, and an operation of adjust the sleep time of the BT/BLE communication scheme associated with the first external device, based on a determination result.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication module configured to communicate with a first external device and a second external device; and
a processor configured to be operatively connected to the communication module,
wherein the communication module uses a Bluetooth (BT)/Bluetooth Low Energy (BLE) communication scheme with the first external device,
wherein the communication module uses a wireless local area network (WLAN) communication scheme with the second external device, and
wherein the processor is configured to:
identify a first frequency band used for communicating with the first external device,
identify a second frequency band used for communicating with the second external device, and
based on the first frequency band and the second frequency band being at least partially overlapping and an application executed on the electronic device requires low latency, adjust a first sleep time of the BT/BLE communication scheme associated with the first external device, by adjusting at least one of Tsniff, Nsniff attempt, and Nsniff timeout.

2. The electronic device of claim 1, wherein the processor is further configured to adjust the first sleep time of the BT/BLE communication scheme, based on at least one of a type of the first external device and a type of the second external device.

3. The electronic device of claim 1, wherein the processor is further configured to:
monitor first data transmitted to and received from the first external device; and
adjust the first sleep time of the BT/BLE communication scheme associated with the first external device, based on a result of monitoring the first data.

4. The electronic device of claim 3, wherein the processor is further configured to:
monitor second data transmitted to and received from the second external device; and
adjust the first sleep time of the BT/BLE communication scheme associated with the first external device, based on a result of monitoring the second data.

5. The electronic device of claim 4, wherein the processor is further configured to:
determine whether the second data requires low latency or high-capacity data; and
adjust the first sleep time of the BT/BLE communication scheme associated with the first external device, based on a result of determining whether the second data requires low latency or high-capacity data.

6. An operating method of an electronic device comprising:
identifying a first frequency band used for communicating with a first external device;
identifying a second frequency band used for communicating with a second external device; and
based on the first frequency band and the second frequency band being at least partially overlapping and an application executed on the electronic device requires low latency, adjusting a first sleep time of the BT/BLE communication scheme associated with the first external device, by adjusting at least one of Tsniff, Nsniff attempt, and Nsniff timeout, wherein the electronic device uses a Bluetooth (BT)/ Bluetooth Low Energy (BLE) communication scheme with the first external device, and wherein the electronic device uses a wireless local area network (WLAN) communication scheme with the second external device.

7. The operating method of claim 6, wherein the adjusting the first sleep time of the BT/BLE communication scheme associated with the first external device comprises adjusting the first sleep time of the BT/BLE communication scheme based on a type of the first external device and a type of the second external device.

\* \* \* \* \*